US011989653B2

(12) United States Patent  
Gouvine

(10) Patent No.: US 11,989,653 B2
(45) Date of Patent: May 21, 2024

(54) PSEUDO-ROUNDING IN ARTIFICIAL NEURAL NETWORKS

(71) Applicant: Mipsology SAS, Palaiseau (FR)

(72) Inventor: Gabriel Gouvine, Paris (FR)

(73) Assignee: Mipsology SAS, Palaiseau (FR)

( * ) Notice: Subject to any disclaimer, the term of this patent is extended or adjusted under 35 U.S.C. 154(b) by 815 days.

(21) Appl. No.: 16/881,336

(22) Filed: May 22, 2020

(65) Prior Publication Data

US 2021/0365787 A1    Nov. 25, 2021

(51) Int. Cl.
*G06N 3/08*     (2023.01)
*G06F 17/16*    (2006.01)
*G06N 3/04*     (2023.01)
*G06N 3/082*    (2023.01)

(52) U.S. Cl.
CPC ............ G06N 3/082 (2013.01); G06F 17/16 (2013.01); G06N 3/04 (2013.01); G06N 3/08 (2013.01)

(58) Field of Classification Search
CPC .. G06N 3/08; G06N 3/04; G06N 3/02; G06N 3/06; G06N 7/00; G06N 3/082; G06N 3/084; G06N 3/088
See application file for complete search history.

(56) References Cited

U.S. PATENT DOCUMENTS 11,423,313 B1 * 8/2022 Diamant ............... G06N 3/084
2018/0336469 A1 * 11/2018 O'Connor ............. G06N 3/049
2019/0050727 A1 * 2/2019 Anderson ............... G06N 3/08
2019/0266476 A1 * 5/2019 Schorn ............... G06N 3/0454
2020/0175356 A1 * 6/2020 Koehler ............. H03M 7/6005

OTHER PUBLICATIONS

Li, Zhaoqi, et al. "Exploration of numerical precision in deep neural networks." arXiv preprint arXiv:1805.01078 (2018). (Year: 2018).*
Gong, Cheng, et al. "VecQ: Minimal loss DNN model compression with vectorized weight quantization." IEEE Transactions on Computers 70.5 (2020): 696-710. (Year: 2020).*
Nagel, Markus, et al. "Up or down? adaptive rounding for post-training quantization." International Conference on Machine Learning. PMLR, 2020. (Year: 2020).*

(Continued)

*Primary Examiner* — Casey R. Garner

(74) *Attorney, Agent, or Firm* — Georgiy L. Khayet

(57) ABSTRACT

A system for increasing quality of results of computations of an artificial neural network (ANN) by using complex rounding rules for parameters in the ANN is provided, the system comprising one or more processing units configured to: receive a plurality of first parameters for one or more neurons of ANN, the first parameters being of a first data type; and change the first parameters to second parameters of a second data type to obtain a plurality of the second parameters according to a rule in which a distance between at least one first parameter and corresponding second parameter is greater than a distance between the first parameter and a value of the second data type closest to the at least one first parameter. A distance between a vector of the first parameters and a vector of the second parameters is minimized.

19 Claims, 11 Drawing Sheets

(56) References Cited

OTHER PUBLICATIONS

Gong Cheng et al: "VecQ: Minimal Loss DNN Model Compression With Vectorized Weight Quantization", IEEE Transactions On Computers, May 18, 2020 (May 18, 2020), pp. 1-14, XP055776228, Retrieved from the Internet: URL:https://arxiv.org/pdf/2005.08501v1.pdf [retrieved on Feb. 15, 2021] abstract; Sections 1 and 3-6.
Markus Nagel et al: "Up or Down? Adaptive Rounding for Post-Training Quantization", Arxiv .Org, Cornell University Library, 201 Olin Library Cornell University Ithaca, NY 14853, Apr. 22, 2020 (Apr. 22, 2020), XP081650366, abstract; Sections 1-3 and 5-6.
Ron Banner et al: "Post-training 4-bit quantization of convolution networks for rapid-deployment", Arxiv.Org, Cornell University Library, 201 Olin Library Cornell University Ithaca, Ny 14853, Oct. 2, 2018 (Oct. 2, 2018), XP081017284, abstract; Sections 1, 2, 4, and 5-7.
Suyog Gupta et al: "Deep Learning with Limited Numerical Precision", Arxiv .Org, Cornell University Library, 201 Olin Library Cornell University Ithaca, NY 14853, Feb. 9, 2015 (Feb. 9, 2015), XP080677454, abstract; Sections 1 and 3-5.

\* cited by examiner

1100

Receive, a plurality of first parameters to the input values of one or more neurons of ANN, the first parameters being of a first data type
1102

Change the first parameters to second parameters of a second data type to obtain a plurality of the second parameters according to a rule in which a distance between at least one first parameter and corresponding second parameter are greater than a distance between the at least one first parameter and a value of the second data type, the value being closest to the at least one first parameter
1104

FIG. 9

PSEUDO-ROUNDING IN ARTIFICIAL NEURAL NETWORKS

TECHNICAL FIELD

The present disclosure relates generally to data processing and, more particularly, to a system and method for increasing quality of results of computation of artificial neural networks by using complex rounding rules for parameters in the artificial neural networks.

BACKGROUND

Artificial Neural Networks (ANNs) are simplified and reduced models reproducing the behavior of the human brain. The human brain contains 10-20 billion neurons connected through synapses. Electrical and chemical messages are passed from neurons to neurons based on input information and their resistance to passing information. In the ANNs, a neuron can be represented by a node performing a simple operation of addition coupled with a saturation function. A synapse can be represented by a connection between two nodes. Each of the connections can be associated with an operation of multiplication by a constant. The ANNs are particularly useful for solving problems that cannot be easily solved by classical computer programs.

While forms of the ANNs may vary, they all have the same basic elements similar to the human brain. A typical ANN can be organized into layers, and each of the layers may include many neurons sharing similar functionality. The inputs of a layer may come from a previous layer, multiple previous layers, any other layers, or even the layer itself. Major architectures of ANNs include Convolutional Neural Network (CNN), Recurrent Neural Network (RNN), and Long Term Short Memory (LTSM) network, but other architectures of ANN can be developed for specific applications. While some operations have a natural sequence, for example a layer depending on previous layers, most operations can be carried out in parallel within the same layer. The ANNs can then be computed in parallel on many different computing elements similar to neurons of the brain. A single ANN may have hundreds of layers. Each of the layers can involve millions of connections. Thus, a single ANN may potentially require billions of simple operations like multiplications and additions.

Because of the larger number of operations and their parallel nature, ANNs can result in a very heavy load for processing units (e.g., CPU), even ones running at high rates. Sometimes, to overcome limitations of CPUs, graphics processing units (GPUs) can be used to process large ANNs because GPUs have a much higher throughput capacity of operations in comparison to CPUs. Because this approach solves, at least partially, the throughput limitation problem, GPUs appear to be more efficient in the computations of ANNs than the CPUs. However, GPUs are not well suited to the computations of ANNs because the GPUs have been specifically designed to compute graphical images.

The GPUs may provide a certain level of parallelism in computations. However, the GPUs are constraining the computations in long pipes implying latency and lack of reactivity. To deliver the maximum throughput, very large GPUs can be used, which may involve excessive power consumption, which is a typical issue of GPUs. Since the GPUs may require more power consumption for the computations of ANNs, the deployment of GPUs can be difficult.

CPUs provide a very generic engine that can execute very few sequences of instructions with a minimum effort in terms of programming, but lack the power of computing for ANN. The GPUs are slightly more parallel and require a larger effort of programming than CPUs, which can be hidden behind libraries with some performance costs but are not very suitable for ANNs.

Field Programmable Gate Arrays (FPGAs) are professional components that can be programmed at the hardware level after they are manufactured. The FPGAs can be configured to perform computations in parallel. Therefore, FPGAs can be well suited to compute ANNs. One of the challenges of FPGAs is the programming, which requires a much larger effort than programming CPUs and GPUs. Adaption of FPGAs to perform ANN computations can be more challenging than for CPUs and GPUs.

Most attempts in programming FPGAs to compute ANNs have been focusing on a specific ANN or a subset of ANNs requiring modification of the ANN structure to fit into a specific limited accelerator or providing a basic functionality without solving the problem of computing ANN on FPGAs globally. The computation scale is typically not considered for existing FPGA solutions, with much of the research being limited to a single or few computation engines, which could be replicated. The existing FPGA solutions do not solve the problem of massive data movement required at a large scale for the actual ANN involved in real industrial applications. The inputs to be computed with an ANN are typically provided by an artificial intelligence (AI) framework. Those programs are used by the AI community to develop new ANN or global solutions based on ANNs. Furthermore, the FPGAs lack integration in those software environments.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to an example embodiment, a system for increasing quality of results of computation of an ANN by using complex rounding rules for parameters in the ANN is provided. The system may include one or more processing units. The processing units can receive a plurality of first parameters for one or more neurons of ANN. The first parameters can be of a first data type. The processing units can change the first parameters to second parameters of a second data type to obtain a plurality of the second parameters according to a rule in which a distance between at least one first parameter and corresponding second parameter is greater than a distance between the at least one first parameter and a value of the second data type, the value being closest to the at least one first parameter. Changing the first parameters to second parameters of a second data type may require scaling the range of the first data type to a range of the second data type prior to the changing.

Changing the first parameters according to the rule can be different from rounding the first parameters to the nearest values of the second data type.

The plurality of the first parameters may include parameters $A$ and $B$ such that $A \leq B$ and the parameter $A$ may correspond to a parameter $\tilde{A}$ of the plurality of the second parameters and the parameter $B$ corresponds to a parameter $\tilde{B}$ of the plurality of the second parameters, such that $\tilde{A} > \tilde{B}$.

The plurality of the first parameters may include a parameter A, such that: $Ã_L$ is a first number of the second data obtained by rounding the parameter A down, $Ã_H$ is a second number of the second data obtained by rounding the parameter A up, and the parameter A corresponds to parameter $Ã$, and $Ã$ is located outside an interval $[Ã_L; Ã_H]$.

The second data type can be formed by a subset of values of the first data type. After the first parameters are changed to the second parameters, a vector distance between a vector of the first parameters and a vector of the second parameters is a minimum of vector distances between the vector of the first parameters and vectors of values of the second data type. The vector distance can be determined by an average of the absolute values of the differences between the first parameters and the second parameters. Alternatively, the vector distance can be determined by a formula using the first parameters and the second parameters and returning an overall quality of the rounding.

The changing the first parameters can be performed by iterations. The iterations may include the following steps: selecting a parameter from the plurality of the second parameters, modifying the selected parameter to a different value of the second data type, computing a vector distance between a vector of the second parameters and a vector of the first parameters, and keeping the different value for the selected parameter if the vector distance is less than the vector distance at a preceding iteration. The iterations can be terminated when the vector distance has not decreased substantially during a predetermined number of the iterations. During the iterations, the parameter can be selected randomly.

A precision of the second type is less than a precision of the first data type. The first data type can be a floating-point data type and the second data type can be a fixed-point data type. The plurality of the first parameters includes one or more of the following: weights to the input values, activation function parameters, offsets to products of sums of the weights and the input values, and static inputs to the one or more neurons. The plurality of the first parameters can be associated with a feature map. The plurality of the first parameters can be associated with neurons selected from a proper subset of neurons of the ANN. The first parameters can be obtained by one or more of the following: training the ANN, retraining the ANN, and pruning the ANN.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements and, in which:

FIG. 9 is a flow chart showing steps of a method for rounding parameters in ANN quantization, according to some example embodiments of the disclosure.

DETAILED DESCRIPTION

Figure 1:
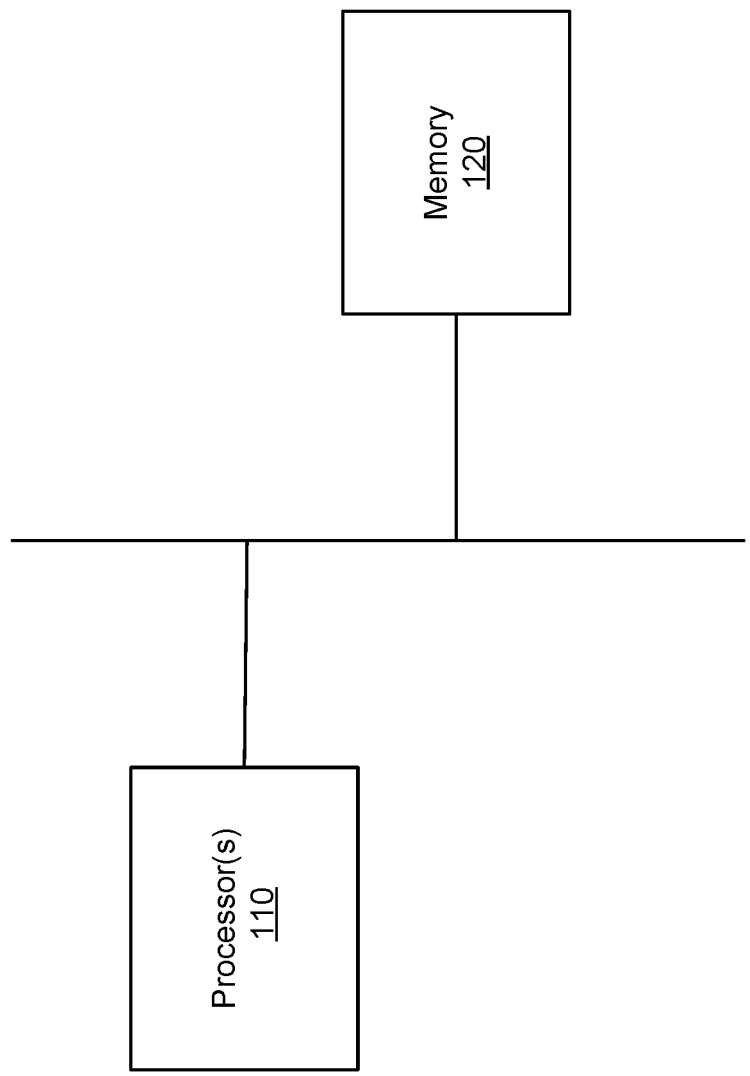
FIG. 1 is a block diagram showing an example system for quantization data in ANN computations, according to some example embodiments.

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

For purposes of this document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

The present disclosure is directed to improving quality of results of computations of ANNs when using lower precision of computations. Typically, ANNs are trained using a high precision data type. However, to reduce the cost of implementing ANNs, computations of ANNs can be performed using a lower precision data type than the data type used for the training the ANNs. A conversion of data from the high precision to low precision can be performed by rounding the values, such as weights and biases, to close numbers of the lower precision type. For example, weights of the ANN can be converted from real numbers such as 32-bit floating numbers, to integers, such as 8-bit integers. This approach allows reducing a number of bit operations and memory required for performing computations of ANN.

Typically, during the conversion, a weight presented by a real number W is converted to integer I, which is the closest to the real number W.

The present disclosure provides systems and methods for increasing quality of results of computation of an ANN by using complex rounding rules for ANN parameters $\{p_1, p_2, \ldots, p_N\}$ represented by a first data type into parameters $\{q_1, q_2, \ldots, q_N\}$ represented by a second data type, wherein $p_i$ is mapped to $q_i, i=1, \ldots, N$. The precision of the second data type can be lower than the precision of the first data type. The ANN parameters $\{p_1, p_2, \ldots p_N\}$ can be involved in computations of a set of neurons $\{\eta_1, \eta_2, \ldots, \eta_M\}$ of the ANN. The set $\{\eta_1, \eta_2, \ldots \eta_M\}$ may include a single neuron, neurons belonging to one or more feature maps, neurons belonging to a single layer of the ANN, or neurons belonging to different layers of the ANN. However, the set $\{\eta_1, \eta_2, \ldots, \eta_M\}$ is smaller than a full set of all neurons in the ANN. The $\{p_1, p_2, \ldots, p_N\}$ may include weights, biases, or combinations of weights and biases required for calculations of the neurons of the set $\{\eta_1, \eta_2, \ldots, \eta_M\}$.

According to embodiments of the present disclosure, a scheme of rounding ANN parameters $\{p_1, p_2, \ldots, p_N\}$ to parameters $\{q_1, q_2, \ldots, q_N\}$ eliminates the need for preserving an order between ANN parameters $\{p_1, p_2, \ldots, p_N\}$. That is, there could be k and l such that $p_k < p_l$ and $q_k \geq q_l$.

At least one parameter $p_i$ from the ANN parameters $\{p_1, p_2, \ldots, p_N\}$ can be mapped to a value $q_i$ of the second data type that is not closest to the parameter $p_i$. That is, there could be a value $\tilde{q}$ of the second data type such that $|p_i - \tilde{q}| < |p_i - q_i|$.

At least one parameter $p_i$ from the ANN parameters $\{p_1, p_2, \ldots p_N\}$ can be mapped to a value $q_i$ which is outside of the range [r; s] determined by second type values r and s closest to the parameter $p_i$. That is, $r < p_i < s$, there are no other second type values between r and s, and $p_i$ is mapped to $q_i$, such as either $q_i < r$ or $s < q_i$.

According to an embodiment of the disclosure, increasing quality of results of computation of an ANN by using complex rounding rules for ANN parameters $\{p_1, p_2, \ldots, p_N\}$ into parameters $\{q_1, q_2, \ldots, q_N\}$ does not require input values for the neurons. The method for rounding can be based on the minimization of error D between the ANN parameters $\{p_1, p_2, \ldots, p_N\}$ and the parameters $\{q_1, q_2, \ldots, q_N\}$. In some embodiments, the error D is an average of differences $\{|p_1-q_1|, |p_2-q_2|, \ldots, |p_N-q_N|\}$ or any other metric based on the distances between $p_i$ and $q_i$.

The values of the parameters $\{q_1, q_2, \ldots, q_N\}$ corresponding to the minimum of error D can be found in an iterative process. A parameter of $q_i$ can be selected and a value for the parameter of $q_i$ can be modified, iteratively, by either selecting the next closest value of the second data type or by selecting a random value. For each modification of the parameter of $q_i$ the distance between the parameters $\{p_1, p_2, \ldots, p_N\}$ and the parameters $\{q_1, q_2, \ldots, q_N\}$ is recalculated. If the error D is less than a threshold, then iterations are terminated. If the error D exceeds the threshold and the rate of change of the error D in the last iterations is low, the method proceeds with selecting another parameter $q_1$ and modifying, in iterations, a value of the parameter $q_1$.

Parameters $\{p_1, p_2, \ldots, p_N\}$ can include activation functions, biases, weights, and inputs. Parameters $\{p_1, p_2, \ldots, p_N\}$ can belong to several layers in a row.

Technical effects of certain embodiments of the present disclosure can include increasing accuracy of fixed-point ANN computations. Further technical effects of certain embodiments of the present disclosure can allow decreasing saturations of neurons in fixed-point ANN computations.

Referring now to the drawings, exemplary embodiments are described. The drawings are schematic illustrations of idealized example embodiments. Thus, the example embodiments discussed herein should not be construed as limited to the particular illustrations presented herein, rather these example embodiments can include deviations and differ from the illustrations presented herein.

FIG. 1 is a block diagram showing an example system 100 for increasing quality of results computation of an ANN by using complex rounding rules for parameters in ANN, according to some example embodiments. The system 100 can be part of a computing system, such as a personal computer, a server, a cloud-based computing resource, and the like. The system 100 may include one or more processing unit(s) 110 and a memory 120. The memory 120 may include computer-readable instructions for execution by the processing unit(s) 110. The processing unit(s) 110 may include a programmable processor, such as a microcontroller, CPU, and so forth. In other embodiments, the processing unit(s) 110 may include an application-specific integrated circuit(s) or programmable logic array(s), such as an FPGA(s), designed to implement the functions performed by the system 100. In various embodiments, the system 100 may be installed on a remote server or may be provided as a cloud service residing in a cloud storage.

The processing unit(s) 110 may be configured to receive a structure and parameters of an ANN. The parameters of the ANN can be presented in a first data type.

In some example embodiments, the processing unit(s) 110 may be configured to receive a plurality of first parameters for one or more neurons of ANN, the first parameters being of a first data type. The processing unit(s) 110 may change the first parameters to second parameters of a second data type to obtain a plurality of the second parameters. The change can be performed according to a rule in which a distance between at least one first parameter and corresponding second parameter is greater than a distance between the at least one first parameter and a value of the second data type, the value being closest to the at least one first parameter. According to the rule, a vector distance between a vector of the first parameters and a vector of the second parameters can be a minimum of vector distances between the vector of the first parameters and vectors of values of the second data type. The details of the rules for modification of the first parameters to second parameters are described below with reference to FIG. 6.

In embodiments of the present disclosure, computation of a neuron of the ANN using values of the second data type may require fewer operations of the processing unit(s) 110 than the computation of the same neuron of the ANN using values of the first data type. The input datasets presented using the second data type may require less memory to be stored than the same input datasets presented using the first data type. While, for simplicity, some embodiments of the present disclosure deal with real numbers as the first data type and integers as the second data type, similar methods can be used for mapping data using another first data type and another second data type. For example, the first data type may include floating point real numbers and the second data type may include fixed-point real numbers. In another example, the first data type can include double precision floating point numbers and the second data type may include single precision floating-point numbers. In another example, the first data type may include 32-bit floating point numbers and the second data type may include 8-bit integers. In yet another example, the first data type may include 8-bit integers and the second data type may include 4-bit integers.

Figure 2:
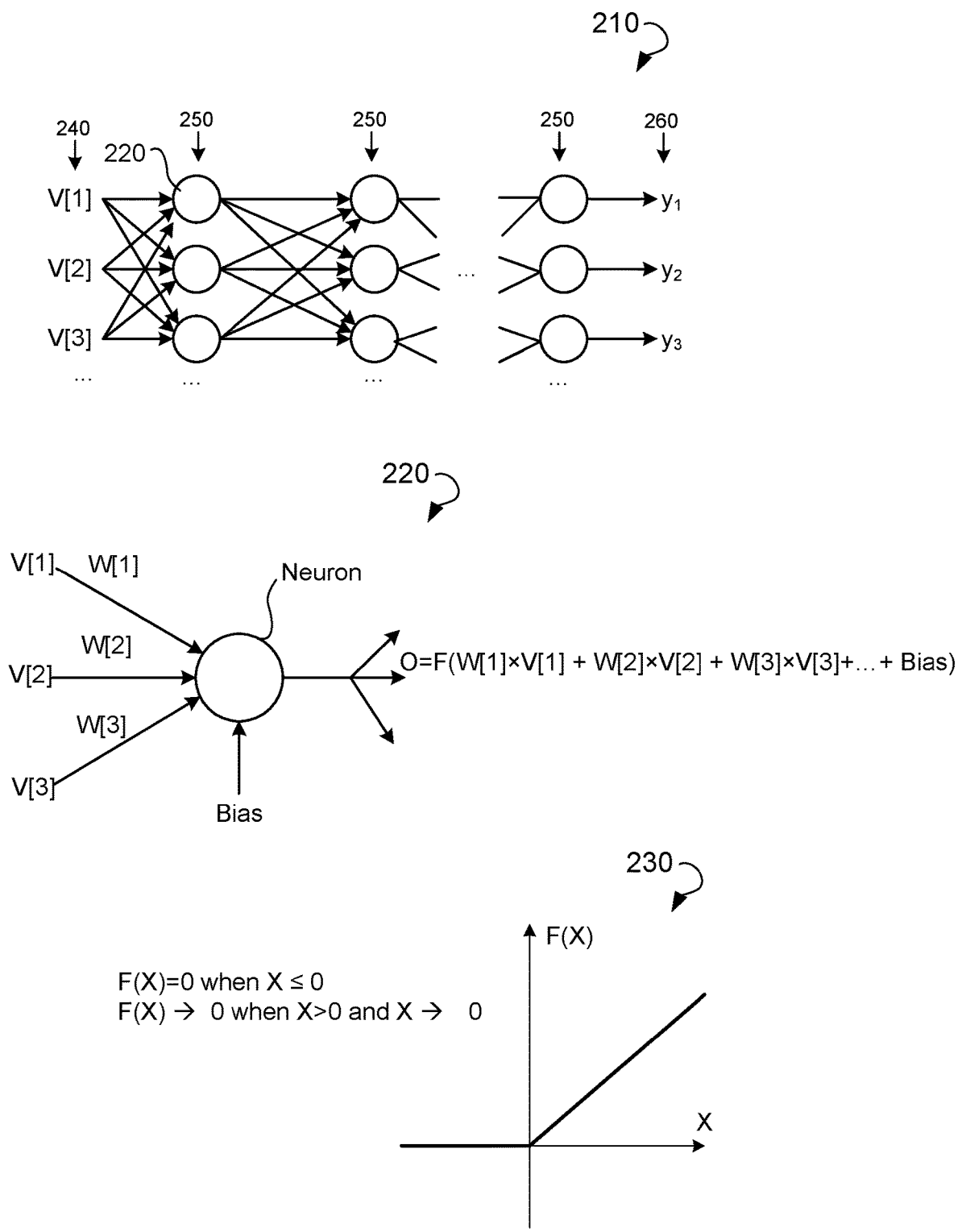
FIG. 2 shows an ANN, neuron, and transfer function, according to an example embodiment.

FIG. 2 shows ANN 210, neuron 220, and transfer function 230, according to some example embodiments. The ANN 210 may include one or more input layers 240, one or more hidden layers 250, and one or more output layers 260. Each of the input layers 240, hidden layers 250, and output layers 260 may include one or more (artificial) neurons 220. The number of neurons can be different for different layers.

Each of neurons 220 may be represented by a calculation of a mathematical function $$O = F\left(\sum_{i=1}^{n} V[i] \times W[i] + \text{bias}\right) \quad (1)$$

wherein V[i] are input values to a neuron, W[i] are weights assigned to the input values at the neuron, bias is an offset to a weighted sum of the input values, and F(X) is a transfer function applied to the weighted sum. Typically, the transfer function 230 F(X) is selected to have a limit of zero as X approaches zero. For example, the transfer function 230 F(X) can be in the form of a sigmoid. The result of the calculation of a neuron propagates as an input value of further neurons in the ANN. The further neurons can belong to either the next layer, previous layer, or the same layer.

It should be noted that while the ANN 210 illustrated in FIG. 2 can be referred to as a feedforward neural network, embodiments of the present disclosure can be also used in computations of convolution neural networks, recurrent neural networks, long short-term memory networks, and other types of ANNs.

Figure 3A:
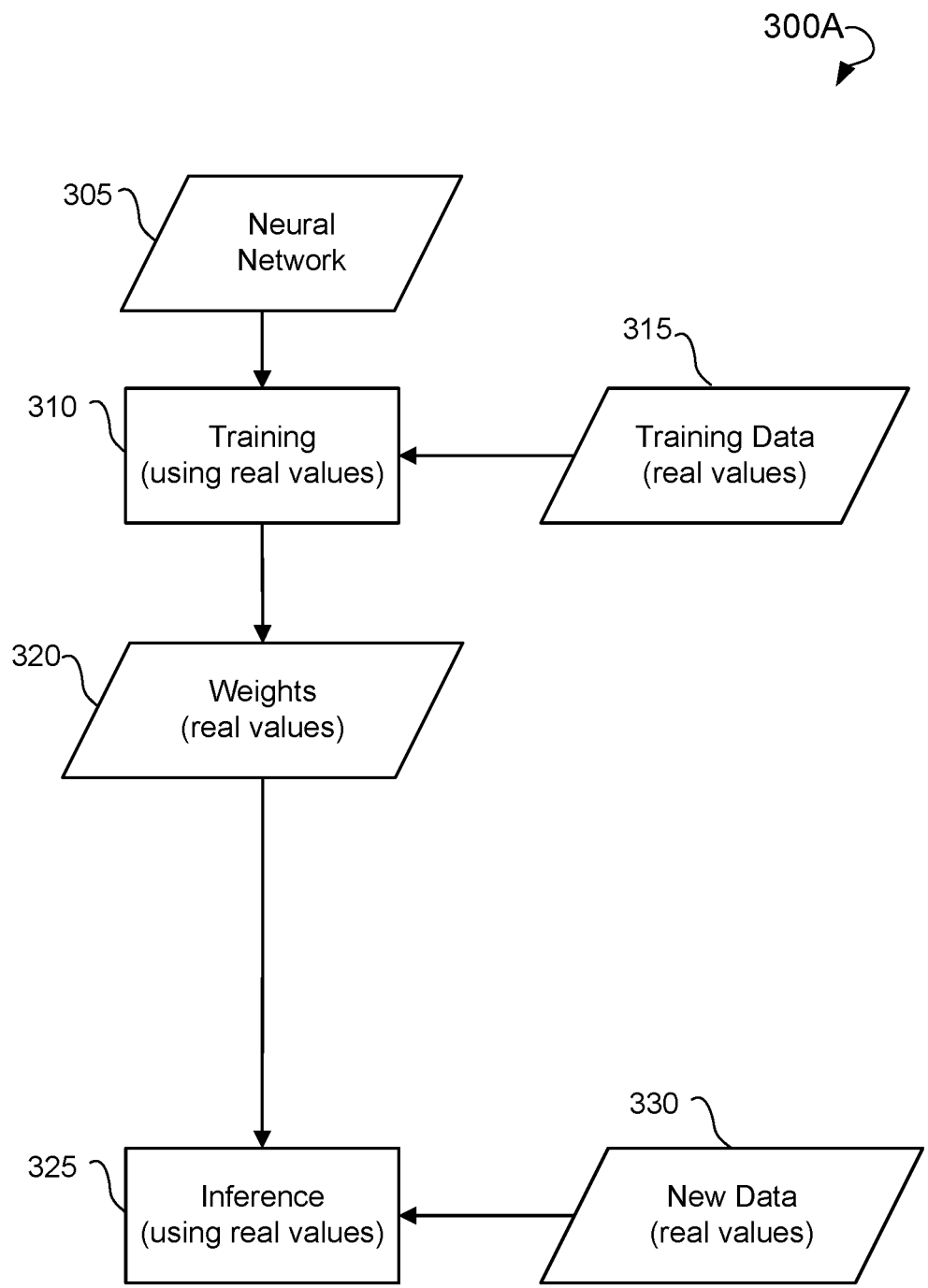
FIG. 3A is a flow chart showing training and inference of an ANN performed with the same data type, according to some example embodiments.

FIG. 3A is a flow chart showing a workflow 300A for training 310 and inference 325 of an ANN, according to some example embodiments. The training 310 (also known as learning) is a process of teaching ANN 305 to output a proper result based on a given set of training data 315. The process of training may include determining weights 320 of neurons of the ANN 305 based on training data 315. The training data 315 may include samples. Each sample may be represented as a pair of input values and expected output. The training data 315 may include hundreds to millions of samples. While training 310 is required to be performed only once, it may require a significant amount of computations and may take a considerable time.

The ANNs can be configured to solve different tasks including, for example, image recognition, speech recognition, handwriting recognition, machine translation, social network filtering, video games, medical diagnosis, and so forth.

The inference 325 is a process of computation of an ANN. The inference 325 uses the trained ANN weights 320 and new data 330 including new sets of input values. For each new set of input values, the computation of the ANN provides a new output that answer the problem that the ANN is supposed to solve. For example, an ANN can be trained to recognize various animals in images. Correspondingly, the ANN can be trained using millions of images of animals. Submitting a new image to the ANN would provide the information concerning animals in the new image (this process being known as image tagging). While the inference for each image takes fewer computations than training, the number of inferences can be large because new images can be received from billions of sources.

The inference 325 includes multiple computations of sum of the following products:

$$\sum_{i=1}^{n} V[i] \times W[i] \quad (2)$$

wherein the V[i] are new input values to neurons and W[i] are weights associated with the input values to the neurons of the ANN.

It should be noted that both training 310 and inference 325 in FIG. 3A are performed using computations based on the same type of data (for example, real values in floating-point format). Performing inference for a large number of input datasets of new data 330 using floating-point calculations can be time consuming and may require significant computing resources for computations of an ANN.

In some embodiments, the inference of an ANN be performed using integer-based or fixed-point calculations in order to reduce computation time and computing resources required to perform ANN computations. To perform integer-based inference, real (floating point) values of input data and weights associated with the ANN can be quantized. Generally, quantization can be referred to as a process of reduction of the number of bits that represent a real value number. For example, the quantization may include converting 32-bit floating point numbers into 8-bit integers. The quantization may significantly reduce bandwidth of ANN computations and memory storage required to store input data, weights, and intermediate results of a layer of the ANN.

Figure 3B:
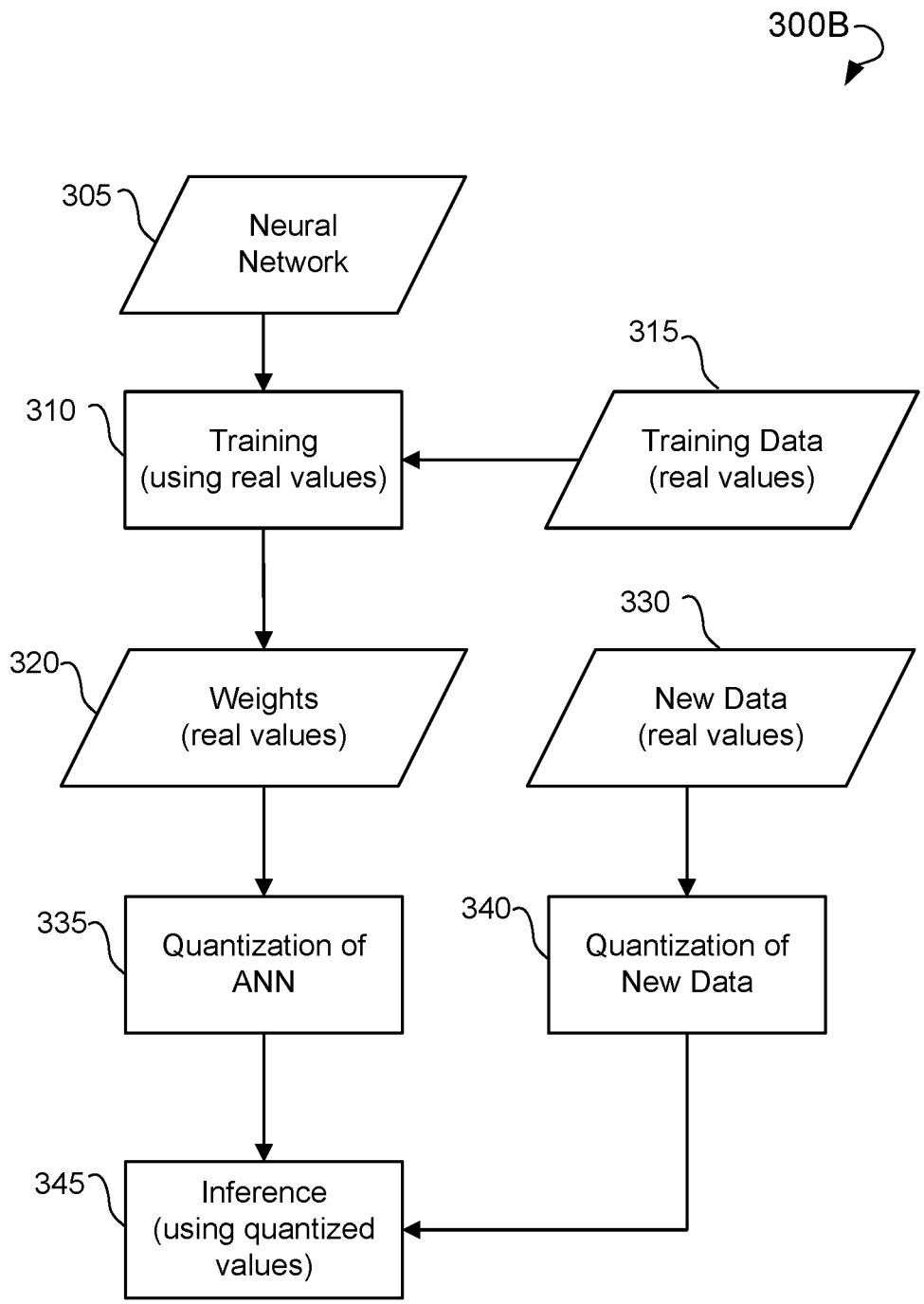
FIG. 3B is a flow chart showing training and inference of an ANN using different data types, according to some example embodiments.

FIG. 3B is a flow chart showing a workflow 300B of training 310 and inference 345 of an ANN using different data types for training and inference, according to some example embodiments. The training 310 can be performed using training data 315. The training data 315 can be of a first data type (for example, real values in the floating-point format). The process of training may include determining weights 320 of neurons of the ANN 305. The weights 320 can be also of the first data type.

After determination of the weights 320 in the first data type, the weights 320 and other parameters of ANN can be quantized in quantization 335. The weights 320 can be mapped to a set including a pre-determined number of values of a second data type. For example, the second data type may include integers. The inference 345 can be further performed using the quantized values for the weights 320. Prior to the inference 345, each input dataset in new data 330 can be also quantized (that is, mapped to the values of the second data type) in quantization 340 using the same quantization workflow as in the quantization 335. Since the weights 320 and the input sets of new data 330 are quantized and converted to the second data type, the inference 345 can be performed using hardware configured to perform computations using only the second data type. The computations using the second data type may require less time and memory resources than the same computations using the first data type. However, the result of the inference 345 performed using the second data type can be less accurate than the result of inference 325 performed using the first data type used in the training of ANN. It should be noted that the quantization differs from a simple data mapping because the quantization of a value of the first data type may result in a different value of the second data type.

Figure 4:
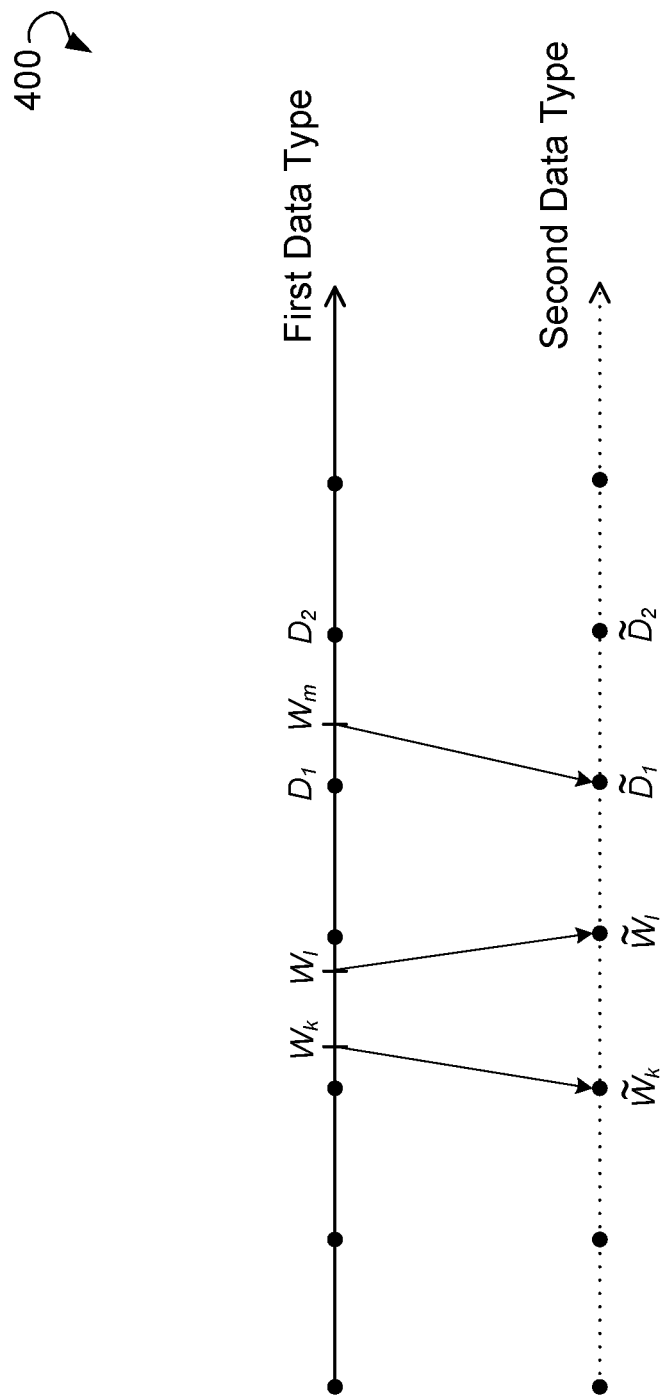
FIG. 4 is a schematic diagram showing a regular rounding in ANN quantization.

FIG. 4 is a schematic diagram 400 showing a regular rounding of parameters in ANN quantization. The weights $\{W_1, W_2, \ldots, W_j, \ldots\}$ are of a first data type. The weights $\{W_1, W_2, \ldots, W_j, \ldots\}$ are rounded to the weights $\{\tilde{W}_1, \tilde{W}_2, \ldots, \tilde{W}_j, \ldots\}$ of a second data type. Prior to rounding weights $\{W_1, W_2, \ldots, W_j, \ldots\}$ to weights $\{\tilde{W}_1, \tilde{W}_2, \ldots, \tilde{W}_j, \ldots\}$, the weights $\{W_1, W_2, \ldots, W_j, \ldots\}$ can be scaled to match the range of weights $\{W_1, W_2, \ldots, W_j, \ldots\}$ in the first data type to the range of the second data type. The second data type can be a subset of values of the first data type. The first data type can be presented by a floating-point format and the second data can be presented by a fix-point format. The second data type can have a lower precision than the first data type. According to the regular rounding, weights $\{W_1, W_2, \ldots, W_j, \ldots\}$ are mapped to closest values of the second data type. It implies that if a weight $W_m$ is located between first data type values $D_1$ and $D_2$ that correspond or equal to the second type values $\tilde{D}_1$ and $\tilde{D}_2$, then the $W_m$ is rounded to either $\tilde{D}_1$ or $\tilde{D}_2$ depending on which of these two values is the nearest to the weight $W_m$. The regular rounding preserves an order between the original weights. That is, if $W_k < W_1$ then $\tilde{W}_1 \leq \tilde{W}_2$. Another conventional rounding method includes always rounding the values of the first type to the values of the second type down. Yet another conventional rounding method includes always rounding the values of the first type to the values of the second type up.

Figure 5:
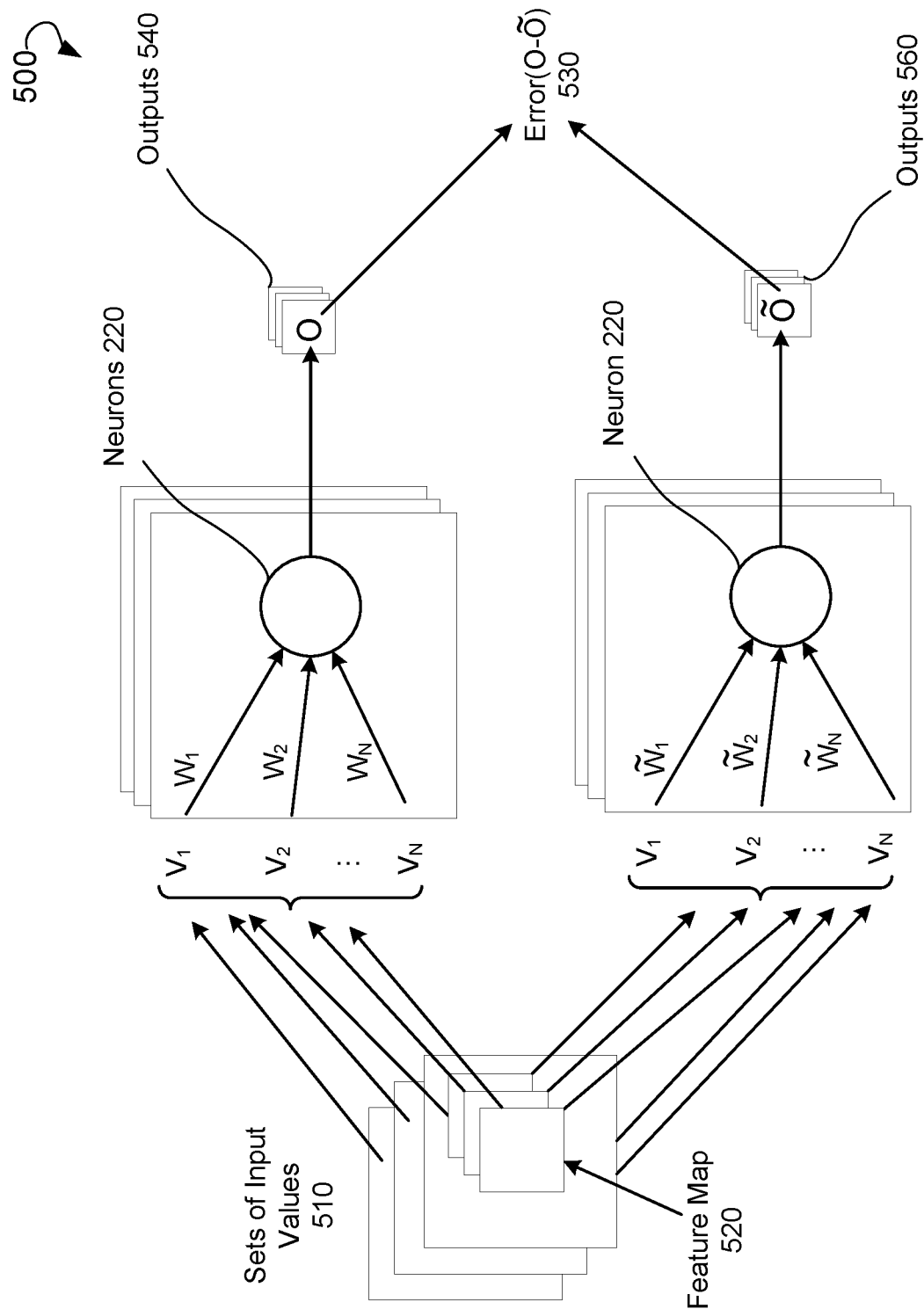
FIG. 5 is a schematic diagram showing a process of determination of a quantization error due to rounding in ANN quantization, according to some example embodiments of the disclosure.

FIG. 5 is a schematic diagram showing a process 500 for determining a quantization error 530 due to rounding of parameters in ANN quantization, according to some example embodiments of the disclosure. The quantization error 530 can be determined using a set of neurons 220. The set of neurons 220 may include a single neuron of an ANN. In certain embodiments, the set of neurons may comprise neurons belonging to a layer of ANN or two or more layers of ANN. However, a number of neurons in the set of neurons 220 is less than the number of all neurons of the ANN. The neurons can be associated with parameters including weights $\{W_1, W_2, \ldots, W_j, \ldots\}$ for the input values for neurons, biases, and parameters of activation function used for computing outputs of neurons. The parameters can be of the first data type (shown in FIG. 4) and can be obtained in one of the following: training the ANN (shown in FIG. 3A), retraining the ANN, and pruning the ANN.

As shown in FIG. 3B, the parameters of the ANN can be quantized (that is, converted from the first data type to a second data type). Typically, a regular rounding (shown in FIG. 4) is used for the conversion of the parameters of the ANN from the first data type to the second data type. In the example of FIG. 5, the weights $\{W_1, W_2, \ldots, W_j, \ldots\}$ of the first data type are converted to the $\{\tilde{W}_1, \tilde{W}_2, \ldots, \tilde{W}_j, \ldots\}$ of the second data type.

In some embodiments, the $\{W_1, W_2, \ldots, W_j, \ldots\}$ can be associated with a kernel that is used to produce a feature map by sliding a window 520 in the sets of input values 510. In some embodiments, the sets of input values 510 may include at least two different sets of input values that represent two different samples to be processed by the ANN. For example, if the ANN is trained to recognize an image, the different sets of input values 510 may represent different images.

The set of outputs 540 of the neurons 220 can be obtained by using the sets of input values 510 and original (unquantized) weights $\{W_1, W_2, \ldots, W_j, \ldots\}$. The set of the outputs 560 of the neurons 220 can be obtained by using the same sets of input values 510 and the quantized weights $\{\tilde{W}_1, \tilde{W}_2, \ldots, \tilde{W}_j, \ldots\}$. A distance between a vector O formed by outputs 540 and a vector $\tilde{O}$ formed by the outputs 560 can represent the quantization error 530. The distance can be found by one or more metrics, such as an average of absolute values of differences between the outputs 540 and the outputs 560, a sum of squares of the differences between the outputs 540 and the outputs 560, a sum of squares of relative differences between the outputs 540 and the outputs 560, and so forth.

The quantization error 530 depends on a method for rounding the weights $\{W_1, W_2, \ldots, W_j, \ldots\}$ to the weights $\{\tilde{W}_1, \tilde{W}_2, \ldots, \tilde{W}_j, \ldots\}$ and rounding other parameters of the neurons 220. The regular rounding shown in FIG. 4 may not result in the lowest value of the quantization error 530. Typically, retraining, or fine training of the ANN can be performed to reduce the error 530 resulting from the quantization. However, retraining requires a substantial amount of computing and input data for the ANN. The retraining may not result in better results of computations of the ANN if the inference system for the ANN is not known precisely.

Figure 6:
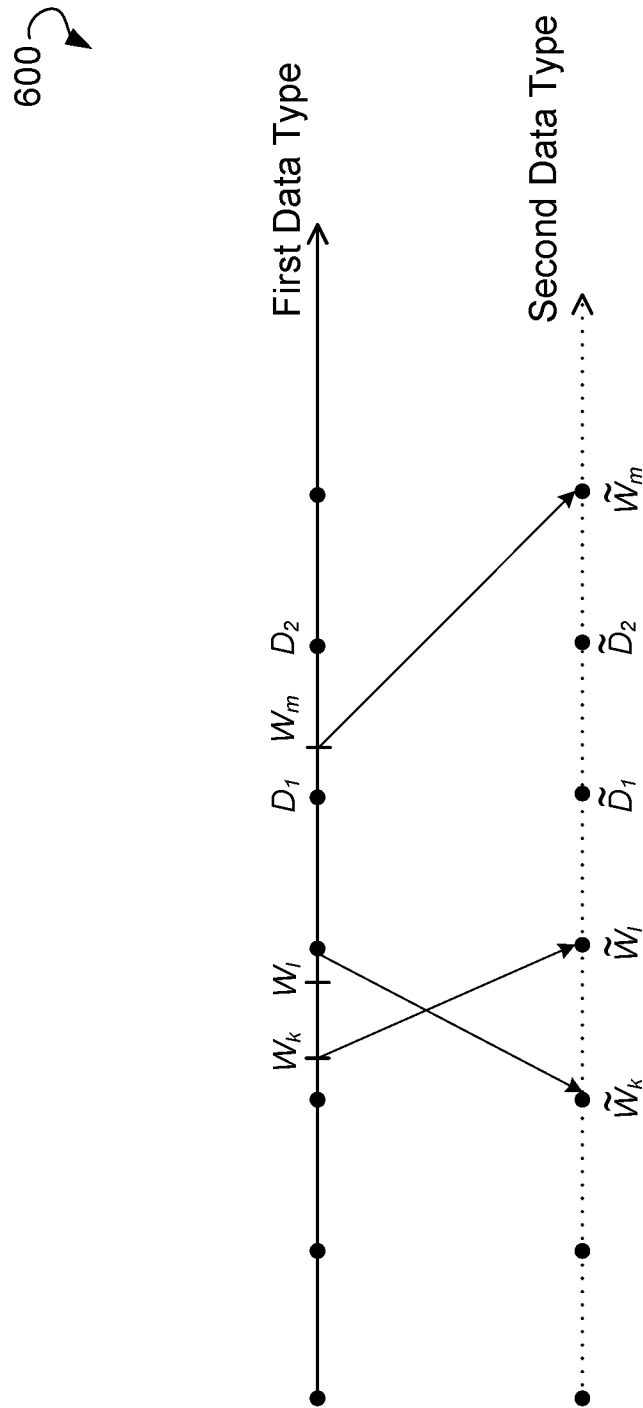
FIG. 6 is a schematic diagram showing rounding in ANN quantization according to some example embodiments of the disclosure.

FIG. 6 is a schematic diagram 600 showing results of computations of an ANN by using complex rounding rules for ANN parameters, according to some example embodiments of the disclosure. The weights $\{W_1, W_2, \ldots, W_j, \ldots\}$ are of a first data type. The weights $\{\tilde{W}_1, \tilde{W}_2, \ldots, \tilde{W}_j, \ldots\}$ are of a second data type and correspond to the weights $\{W_1, W_2, \ldots, W_j, \ldots\}$. The weights $\{\tilde{W}_1, \tilde{W}_2, \ldots, \tilde{W}_j, \ldots\}$ can be scaled so the range of weights $\{\tilde{W}_1, \tilde{W}_2, \ldots, \tilde{W}_j, \ldots\}$ in the first data type matches the range of the second data type. The weights $\{\tilde{W}_1, \tilde{W}_2, \ldots, \tilde{W}_j, \ldots\}$ may produce a lower error 530 than the weights obtained by regular rounding in quantization of the weights $\{W_1, W_2, \ldots, W_j, \ldots\}$ However, the scheme of rounding the $\{W_1, W_2, \ldots, W_j, \ldots\}$ to the weights $\{\tilde{W}_1, \tilde{W}_2, \ldots, \tilde{W}_j, \ldots\}$ may result in one of the following permissions for modifications of weights $\{\tilde{W}_1, \tilde{W}_2, \ldots, \tilde{W}_j, \ldots\}$.

There could be k and l, for which $W_k < W_l$, but $W_k > W_l$. That is, the rounding of parameters that result to a lower error 530 than the regular rounding may not preserve an order between the parameters. There also could be l, for which $W_l$ is not rounded to the nearest value in the second data type.

There also could be m, for which $W_m$ is not rounded to either the nearest value in the second data type not exceeding the $W_m$ or the nearest value in the second data type exceeding the $W_m$.

Figure 7:
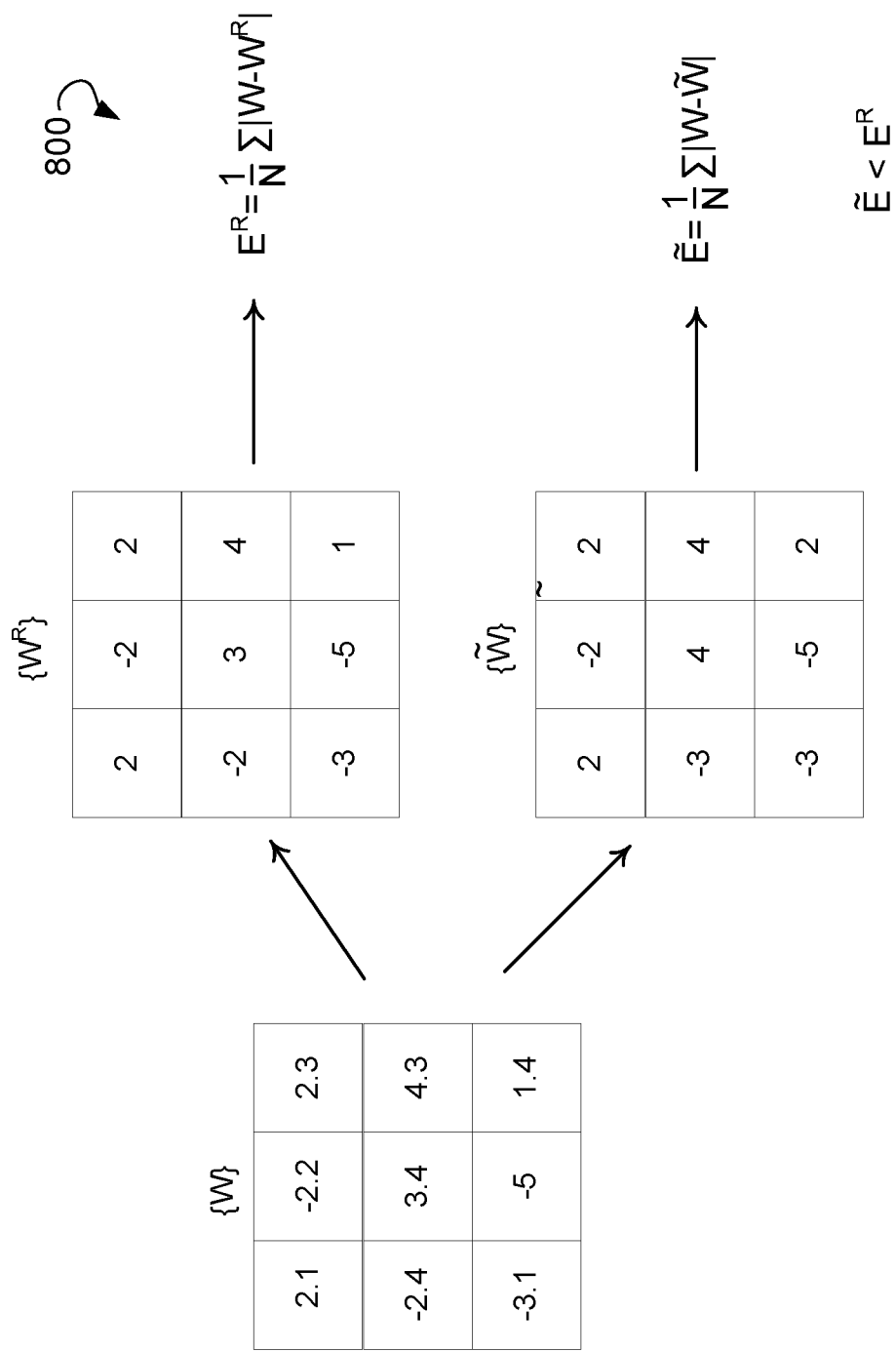
FIG. 7 is a schematic diagram showing a process of determination of a quantization error due to rounding in ANN quantization, according to some other example embodiments of the disclosure.
Figure 8:
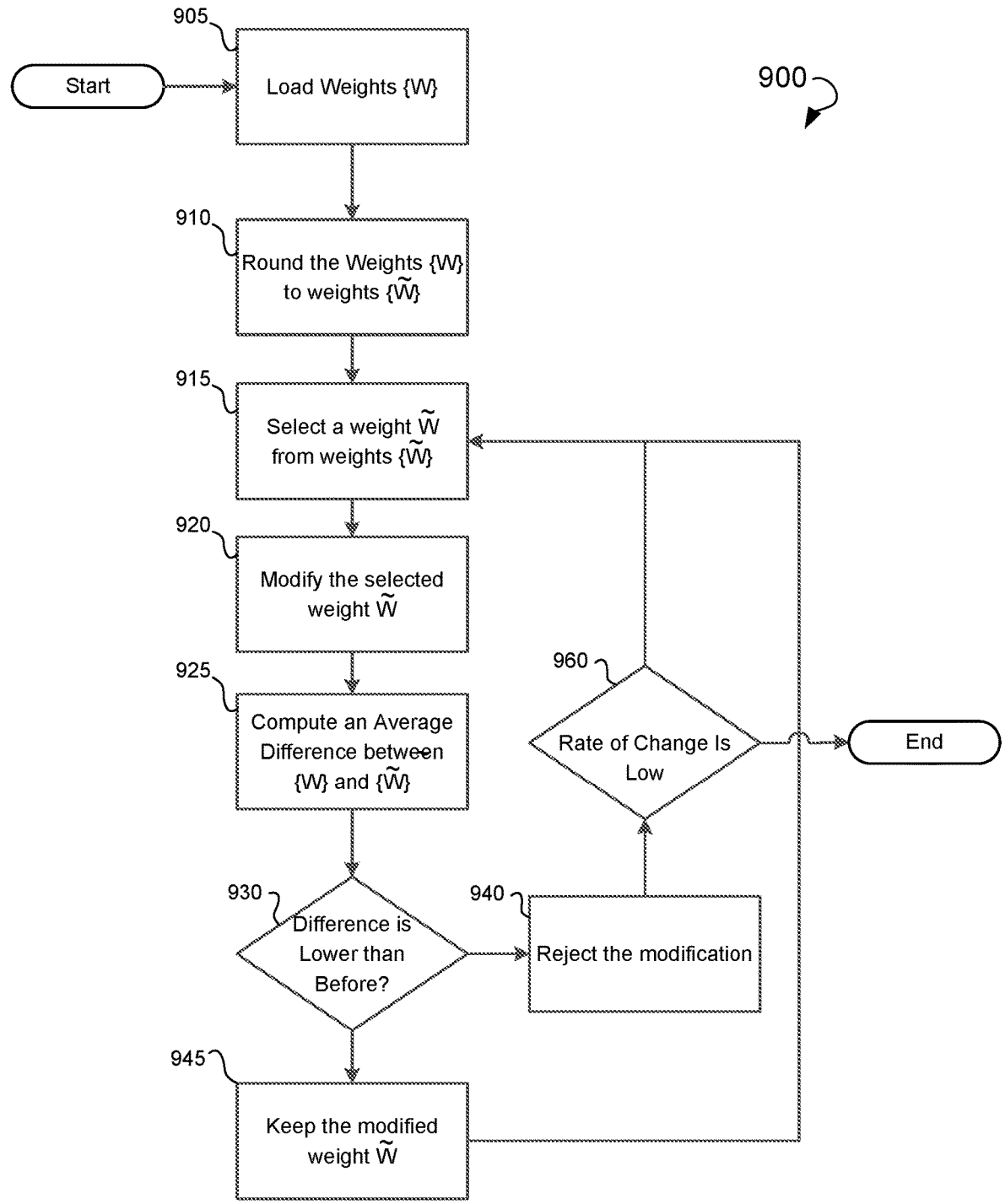
FIG. 8 is a flow chart showing steps of a method for rounding parameters of ANN, according to some example embodiments of the disclosure.

FIG. 7 is a schematic diagram showing a process 800 of determination of a quantization error due to rounding in ANN quantization, according to some other example embodiments of the disclosure. The process 800 does not involve loading sets of input values to neurons or computing outputs of the neurons. The process 800 requires only loading weights associated with input values to the neurons. In the example of FIG. 8, the plurality of weights $\{W_i\}$, $i=1, \ldots, N$ are associated with a kernel for determining a feature map. The weights $\{W_i\}$, $i=1, \ldots, N$ are of a first data type.

The weights $\{W_i^R\}$, $i=1, \ldots, N$ are obtained by regular rounding of the weights $\{W_i\}$, $i=1, \ldots, N$ to a second data type as shown in FIG. 4 and performed typically in conventional quantization of ANN. The weights $\{\tilde{W}_i\}$, $i=1, \ldots, N$ are obtained by rounding of the weights $\{W_i\}$, $i=1, \ldots, N$ with the permissions for modifications of weights $\{W_i\}$, $i=1, \ldots, N$ as described in FIG. 6.

The rounding error $E^R$ can be defined as a distance between a vector formed by the original weights $\{W_i\}$, $i=1, \ldots, N$ and a vector formed by the weights $\{W_i^R\}$, $i=1, \ldots, N$ obtained by regular rounding. The rounding error E can be defined as a distance between the vector formed by the original weights $\{W_i\}$, $i=1, \ldots, N$ and a vector formed by the weights $\{\tilde{W}_i\}$, i=1, ..., N obtained by rounding with permissions shown un FIG. 6. As can be seen, the rounding error $\tilde{E}<E^R$.

In another embodiment, the distance between a vector formed by the original weights $\{W_i\}$, i=1, ..., N and a vector formed by the weights $\{W_i^R\}$, i=1, ..., N obtained by regular rounding can be determined as a distance between a vector of scaled values of weights $\{f_i \times W_i\}$, i=1, ..., N and a vector of scaled values $\{f_i \times W_i^R\}$, i=1, ..., N, wherein $\{f_i\}$, i=1, ..., N are scale factors depending on the impacts of the weights $\{W_i\}$, i=1, ..., N on the result of the ANN.

FIG. 8 is a flow chart showing steps of a method for rounding parameters in ANN quantization, according to some example embodiments of the disclosure. The method 900 may be performed by the system 100 described above with reference to FIG. 1.

The method 900 may commence, in block 905, with loading weights $\{W_i\}$, i=1, ..., N associated with input values to one or more neurons of an ANN. The weights $\{W_i\}$, i=1, ..., N can include weights of the ANN found in training, retraining, and, optionally, pruning of the ANN. The weights $\{W_i\}$, i=1, ..., N can be of a first data type.

In block 910, the weights $\{W_i\}$, i=1, ..., N can be rounded to weights $\{\tilde{W}_i\}$, i=1, ..., N of the second data type. In some embodiments, a regular rounding scheme can be used in the block 910. The regular rounding scheme is described in FIG. 4. In some embodiments, the initial rounding of weights in block 910 can be performed based on a rule according to which: 1) a number of the weights $\{\tilde{W}_i\}$, i=1, ..., N higher than an average of the weights $\{\tilde{W}_i\}$, i=1, ..., N is the same as a number of the weights $\{W_i\}$, i=1, ..., N higher than an average of the weights $\{W_i\}$, i=1, ..., N and 2) a number of the weights $\{\tilde{W}_i\}$, i=1, ..., N values lower than the average of the weights $\{\tilde{W}_i\}$, i=1, ..., N is the same as a number of the weights $\{W_i\}$, i=1, ..., N lower than an average of the weights $\{W_i\}$, i=1, ..., N. In some embodiments, prior to rounding weights $\{W_i\}$, i=1, ..., N to weights $\{\tilde{W}_i\}$, i=1, ..., N each weight $W_i$ can be scaled so the range of weights $\{W_i\}$, i=1, ..., N in the first data type matches the range of the second data type.

In block 915, the method 900 may start iterations with selecting a weight $\tilde{W}_k$ from the weights $\{\tilde{W}_i\}$, i=1, ..., N. In one example embodiment, the weight $\tilde{W}_k$ can be selected randomly. In other embodiments, the weight $\tilde{W}_k$ can be selected according to a predetermined order or a rule.

In block 920, the method 900 may include modifying to the selected weight $\tilde{W}_k$ to another value of the second data type. The modification may result in rounding of the weight $W_k$ to weight $\tilde{W}_k$ as described in rounding scheme of the FIG. 6.

In block 925, the method 900 may include computing an error as an average of differences between the weights $\{W_i\}$, i=1, ..., N and the current weights $\{\tilde{W}_i\}$, i=1, ..., N.

In decision block 930, the method 900 may determine whether the error is lower than an error calculated before in the preceding iteration. If the error is lower, then the method 900 proceeds, in block 945, with keeping the modified weight $\tilde{W}_k$ and proceeding, in block 915, with selecting another weight $\tilde{W}_k$. If the error is not lower, the method 900 may proceed to block 940.

In block 940, the method 900 may reject the modification of the weight $\tilde{W}_k$ and proceed to the decision block 960. In the decision block 960, the method 900 may estimate a rate of change of the error during a pre-determined number of last iterations. If the rate is higher than a rate threshold, the method 900 may proceed to proceed to block 915 with selecting another weight $\tilde{W}_k$. If the rate is less than the rate threshold, the method 900 may terminate the iterations and proceed, in block 905, with loading next weights for next neurons.

FIG. 9 is a flow chart illustrating a method 1100 for rounding parameters in ANN quantization, in accordance with some example embodiments. In some embodiments, the operations can be combined, performed in parallel, or performed in a different order. The method 1100 may also include additional or fewer operations than those illustrated. The method 1100 may be performed by the system 100 described above with reference to in FIG. 1.

In block 1102, the method 1100 may commence with receiving a plurality of first parameters for one or more neurons of ANN. The first parameters are of a first data type. The plurality of the first parameters includes one or more of the following: weights to the input values, activation function parameters, offsets (biases) to products of sums of the weights and the input values, and static inputs to the one or more neurons. The plurality of the first parameters can be associated with neurons selected from a proper subset of neurons of the ANN. The plurality of the first parameters can be associated with a feature map. The first parameters can be preliminarily obtained by one or more of the following: training the ANN, retraining the ANN, and pruning the ANN.

In block 1104, the method 1100 may include changing the first parameters to second parameters of a second data type to obtain a plurality of the second parameters according to a rule. The rule may allow a distance between at least one first parameter and corresponding second parameter to be greater than a distance between this first parameter and a value of the second data type closest to the at least one first parameter. According to the rule, changing the first parameters is different from rounding the first parameters to the nearest values of the second data type.

In certain embodiments, the second data type can be formed by a subset of values of the first data type. In some embodiments, a precision of the second type is less than a precision of the first data type. The first data type can be a floating-point data type and the second data type can be a fixed-point data type.

In some embodiments, after the first parameters are changed to the second parameters, a vector distance between a vector of the first parameters and a vector of the second parameters is a minimum of vector distances between the vector of the first parameters and vectors of values of the second data type. The vector distance can be determined by an average of the absolute values of the differences between the first parameters and the second parameters.

The second parameters can be determined by performing iterations. The iterations may include the following steps: selecting a parameter from the plurality of the second parameters, modifying the selected parameter to a different value of the second data type, computing a vector distance between a vector of the second parameters and a vector of the first parameters, and keeping the different value for the selected parameter if the vector distance is less than the vector distance at a preceding iteration. The iterations can be terminated when the vector distance has not decreased substantially during a predetermined number of the iterations.

After the first parameters are changed to the second parameters, the plurality of the first parameters includes parameters A and B such that A≤B and the parameter A corresponds to a parameter $\tilde{A}$ of the plurality of the second parameters and the parameter B corresponds to a parameter B̃ of the plurality of the second parameters, such that Ã>B̃.

After the first parameters are changed to the second parameters, the plurality of the first parameters includes a parameter A, such that: $Ã_L$ is a first number of the second data obtained by rounding the parameter A down, $Ã_H$ is a second number of the second data obtained by rounding the parameter A up, and the parameter A corresponds to parameter Ã, and Ã is located outside an interval $[Ã_L; Ã_H]$.

Figure 10:
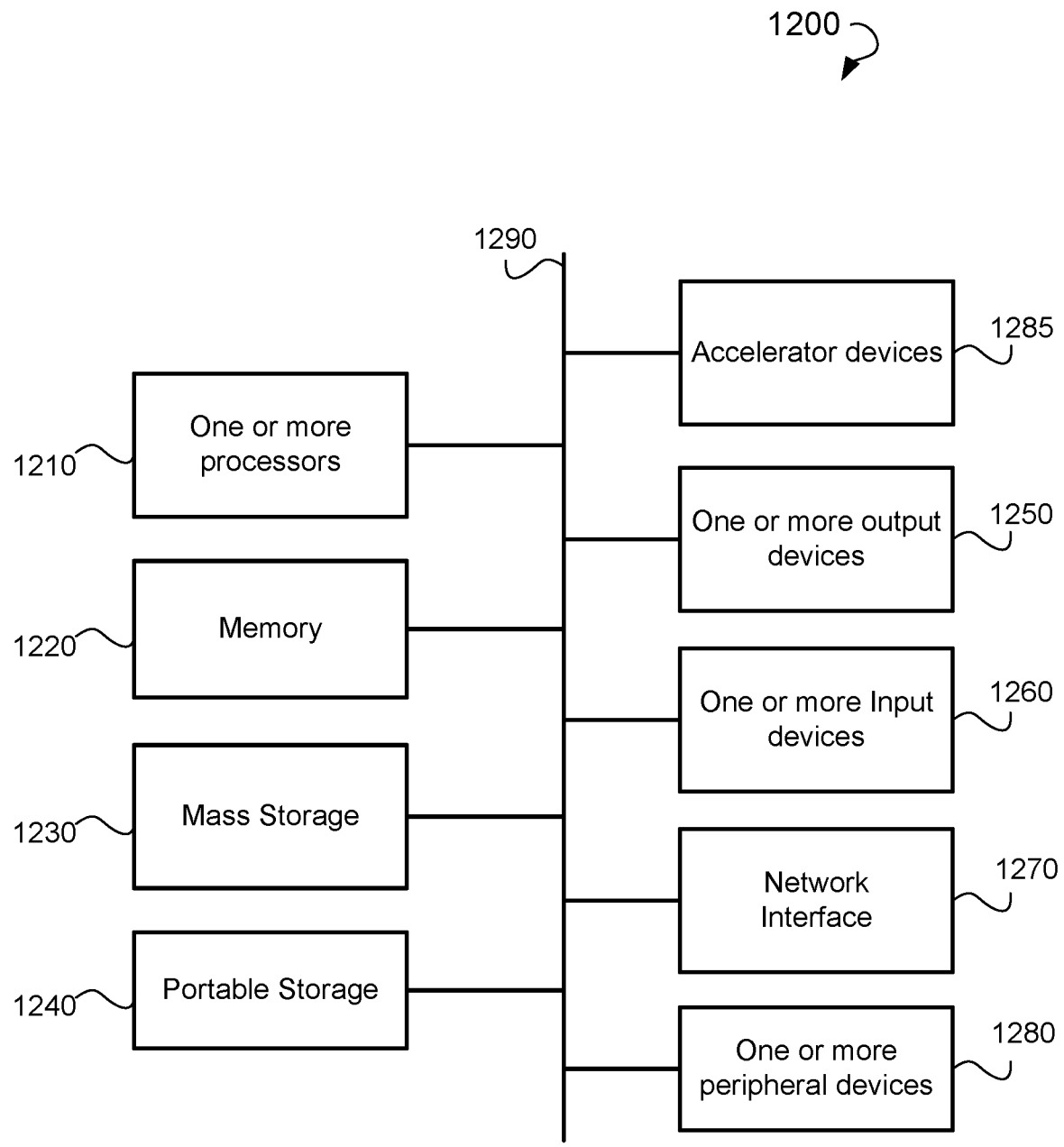
FIG. 10 shows a computing system that can be used to implement embodiments of the disclosed technology.

FIG. 10 illustrates an example computing system 1200 that may be used to implement embodiments described herein. The example computing system 1200 of FIG. 10 may include one or more processors 1210 and memory 1220. Memory 1220 may store, in part, instructions and data for execution by the one or more processors 1210. Memory 1220 can store the executable code when the exemplary computing system 1200 is in operation. The processor 1210 may include internal accelerators like a graphical processing unit, a FPGA, or similar accelerators that may be suitable for use with embodiments described herein. The memory 1220 may include internal accelerators like a GPU, a FPGA, or similar accelerators that may be suitable for use with embodiments described herein. The example computing system 1200 of FIG. 10 may further include a mass storage 1230, portable storage 1240, one or more output devices 1250, one or more input devices 1260, a network interface 1270, and one or more peripheral devices 1280.

The components shown in FIG. 10 are depicted as being connected via a single bus 1290. The components may be connected through one or more data transport means. The one or more processors 1210 and memory 1220 may be connected via a local microprocessor bus, and the mass storage 1230, one or more peripheral devices 1280, portable storage 1240, and network interface 1270 may be connected via one or more input/output buses.

Mass storage 1230, which may be implemented with a magnetic disk drive, an optical disk drive or a solid state drive, is a non-volatile storage device for storing data and instructions for use by a magnetic disk, an optical disk drive or SSD, which in turn may be used by one or more processors 1210. Mass storage 1230 can store the system software for implementing embodiments described herein for purposes of loading that software into memory 1220. The mass storage 1230 may also include internal accelerators like a GPU, a FPGA, or similar accelerators that may be suitable for use with embodiments described herein.

Portable storage 1240 may operate in conjunction with a portable non-volatile storage medium, such as a compact disk (CD) or digital video disc (DVD), to input and output data and code to and from the computing system 1200 of FIG. 10. The system software for implementing embodiments described herein may be stored on such a portable medium and input to the computing system 1200 via the portable storage 1240.

One or more input devices 1260 provide a portion of a user interface. The one or more input devices 1260 may include an alphanumeric keypad, such as a keyboard, for inputting alphanumeric and other information, or a pointing device, such as a mouse, a trackball, a stylus, or cursor direction keys. Additionally, the computing system 1200 as shown in FIG. 10 includes one or more output devices 1250. Suitable one or more output devices 1250 include speakers, printers, network interfaces, and monitors.

Network interface 1270 can be utilized to communicate with external devices, external computing devices, servers, and networked systems via one or more communications networks such as one or more wired, wireless, or optical networks including, for example, the Internet, intranet, LAN, WAN, cellular phone networks (e.g., Global System for Mobile communications network, packet switching communications network, circuit switching communications network), Bluetooth radio, and an IEEE 802.11-based radio frequency network, among others. Network interface 1270 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a USB.

One or more peripheral devices 1280 may include any type of computer support device to add additional functionality to the computing system. The one or more peripheral devices 1280 may include a modem or a router.

The example computing system 1200 of FIG. 10 may also include one or more accelerator devices 1285. The accelerator devices 1285 may include PCIe-form-factor boards or storage-form-factor boards, or any electronic board equipped with a specific electronic component like a GPU, a Neural Processing Unit, a Multi-CPU component, a FPGA component, or similar accelerators electronic or photonic components, that may be suitable for use with embodiments described herein.

The components contained in the exemplary computing system 1200 of FIG. 10 are those typically found in computing systems that may be suitable for use with embodiments described herein and are intended to represent a broad category of such computer components that are well known in the art. Thus, the exemplary computing system 1200 of FIG. 10 can be a personal computer, handheld computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as RAM. Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, SSD, a CD-read-only memory (ROM)

disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. The instructions or data may not be used by the CPU but be accessed in writing or reading from the other devices without having the CPU directing them.

Thus, systems and methods for increasing quality of results of computation of ANN by using complex rounding rules for parameters in ANN have been described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A system comprising:
   one or more processing units configured to:
   receive a plurality of first parameters for one or more neurons of an artificial neural network (ANN), the first parameters being of a first data type;
   generate, based on the plurality of the first parameters, an input in a format readable by a hardware accelerator, the hardware accelerator comprising a circuitry to perform computations of the one or more neurons of the ANN using a second data type, wherein:
   the input includes a plurality of second parameters, each of the second parameters being a value of a set of values of the second data type;
   the generation of the input includes changing the first parameters to the second parameters based on a distance between at least one first parameter and a corresponding second parameter being greater than a distance between the at least one first parameter and a value of the set of values of the second data type, the value being closest to the at least one first parameter; and
   the plurality of the first parameters includes a parameter A, such that:
   $\tilde{A}_L$ is a first number of the set of values of the second data type, $\tilde{A}_L$ being obtained by rounding the parameter A down;
   $\tilde{A}_H$ is a second number of the set of values of the second data type, $\tilde{A}_H$ being obtained by rounding the parameter A up; and
   the parameter A corresponds to a parameter $\tilde{A}$ of the set of values of the second data type, the parameter $\tilde{A}$ being located outside an interval $[\tilde{A}_L; \tilde{A}_H]$; and
   provide the plurality of the second parameters to the hardware accelerator for computing the one or more neurons of the ANN.

2. The system of claim 1, wherein the plurality of the first parameters includes a parameter such that A≤B, the parameter A corresponds to the parameter $\tilde{A}$ of the plurality of the second parameters, and the parameter B corresponds to a parameter $\tilde{B}$ of the plurality of the second parameters, such that $\tilde{A}>\tilde{B}$.

3. The system of claim 1, wherein the plurality of the first parameters includes a parameter such that A=B, the parameter A corresponds to the parameter $\tilde{A}$ of the plurality of the second parameters, and the parameter B corresponds to a parameter $\tilde{B}$ of the plurality of the second parameters, such that $\tilde{A}\neq\tilde{B}$.

4. The system of claim 1, wherein changing the first parameters to the second parameters is different from rounding the first parameters to nearest values of the set of values of the second data type.

5. The system of claim 1, wherein the second data type is formed by a subset of values of the first data type.

6. The system of claim 1, wherein after the first parameters are changed to the second parameters, a vector distance between a vector of the first parameters and a vector of the second parameters is a minimum of vector distances between the vector of the first parameters and vectors of the values of the second data type.

7. The system of claim 6, wherein the vector distance is determined by an average of absolute values of differences between the first parameters and the second parameters.

8. The system of claim 1, wherein the changing includes:
   performing iterations including:
   selecting a parameter from the plurality of the second parameters;
   modifying the selected parameter to a different value of the second data type;
   computing a vector distance between a vector of the second parameters and a vector of the first parameters; and
   keeping the different value for the selected parameter if the vector distance is less than the vector distance at a preceding iteration; and
   terminating the iterations when the vector distance has not decreased substantially during a predetermined number of the iterations.

9. The system of claim 8, wherein the parameter is selected randomly.

10. The system of claim 1, wherein a precision of the second data type is less than a precision of the first data type.

11. The system of claim 1, wherein the first data type is a floating-point data type and the second data type is an integer data type.

12. The system of claim 1, wherein the plurality of the first parameters includes one or more of the following: weights to input values, activation function parameters, offsets to products of sums of the weights and the input values, and static inputs to the one or more neurons.

13. The system of claim 1, wherein the plurality of the first parameters is associated with a feature map.

14. The system of claim 1, wherein a number of the one or more neurons is less than a total number of neurons of the ANN.

15. The system of claim 1, wherein the first parameters are obtained by one or more of the following: training the ANN, retraining the ANN, and pruning the ANN.

16. A method comprising:
   receiving, by one or more processing units, a plurality of first parameters for one or more neurons of an artificial neural network (ANN), the first parameters being of a first data type;
   generating, by the one or more processing units and based on the plurality of the first parameters, an input in a format readable by a hardware accelerator, the hardware accelerator comprising a circuitry to perform computations of the one or more neurons of the ANN using a second data type, wherein:

the input includes a plurality of second parameters, each of the second parameters being a value of a set of values of the second data type;

the generation of the input includes changing the first parameters to the second parameters based on a distance between at least one first parameter and a corresponding second parameter being greater than a distance between the at least one first parameter and a value of the set of values of the second data type, the value being closest to the at least one first parameter; and the plurality of the first parameters includes a parameter A, such that:

$\tilde{A}_L$ is a first number of the set of values of the second data type, $\tilde{A}_L$ being obtained by rounding the parameter A down;

$\tilde{A}_H$ is a second number of the set of values of the second data type, $\tilde{A}_H$ being obtained by rounding the parameter A up; and the parameter A corresponds to a parameter $\tilde{A}$ of the set of values of the second data type, the parameter $\tilde{A}$ being located outside an interval $[\tilde{A}_L; \tilde{A}_H]$; and providing, by the one or more processing units, the plurality of the second parameters to the hardware accelerator for computing the one or more neurons of the ANN.

17. The method of claim 16, wherein the plurality of the first parameters includes a parameter such that A≤B, the parameter A corresponds to the parameter $\tilde{A}$ of the plurality of the second parameters, and the parameter B corresponds to a parameter $\tilde{B}$ of the plurality of the second parameters, such that $\tilde{A} > \tilde{B}$.

18. The method of claim 16, wherein changing the first parameters to the second parameters is different from rounding the first parameters to nearest values of the set of values of the second data type.

19. A system comprising:
one or more processing units configured to:

receive a plurality of first parameters for one or more neurons of an artificial neural network (ANN), the first parameters being of a first data type;

generate, based on the plurality of the first parameters, an input in a format readable by a hardware accelerator, the hardware accelerator comprising a circuitry to perform computations of the one or more neurons of the ANN using a second data type, wherein:

the input includes a plurality of second parameters, each of the second parameters being a value of a set of values of the second data type;

the generation of the input includes changing the first parameters to second parameters based on a vector distance between a vector of the first parameters and a vector of the second parameters being a minimum of vector distances between the vector of the first parameters and vectors of values of the set of values of the second data type; and the plurality of the first parameters includes a parameter A, such that:

$\tilde{A}_L$ is a first number of the set of values of the second data type, $\tilde{A}_L$ being obtained by rounding the parameter A down;

$\tilde{A}_H$ is a second number of the set of values of the second data type, $\tilde{A}_H$ being obtained by rounding the parameter A up; and the parameter A corresponds to a parameter $\tilde{A}$ of the set of values of the second data type, the parameter $\tilde{A}$ being located outside an interval $[\tilde{A}_L; \tilde{A}_H]$; and provide the plurality of the second parameters to the hardware accelerator for computing the one or more neurons of the ANN.

* * * * *